July 10, 1923.  
A. SONANDER  
ELEVATING TRUCK  
Filed Nov. 17, 1919  
1,461,371

WITNESSES:  
H. R. Bartholomew  
W. H. Sargent

INVENTOR.  
Andrew Sonander  
BY  
his ATTORNEYS

Patented July 10, 1923.

1,461,371

UNITED STATES PATENT OFFICE.

ANDREW SONANDER, OF RUTLAND, VERMONT, ASSIGNOR TO HOWE SCALE COMPANY, OF RUTLAND, VERMONT, A CORPORATION OF VERMONT.

ELEVATING TRUCK.

Application filed November 17, 1919. Serial No. 338,730.

*To all whom it may concern:*

Be it known that I, ANDREW SONANDER, a citizen of the United States, residing at Rutland, county of Rutland, and State of Vermont, have invented certain new and useful Improvements in Elevating Trucks, of which the following is a full and clear specification.

This invention relates to trucks or the like and has for its object to provide an improved construction, combination and arrangement of parts in a device of this nature whereby loads may be raised and lowered as well as conveyed from one place to another. Details of invention will appear in the specification and be pointed out in the appended claims, reference being had to the accompanying drawings which exemplify the invention in a preferred embodiment.

Figure 1:
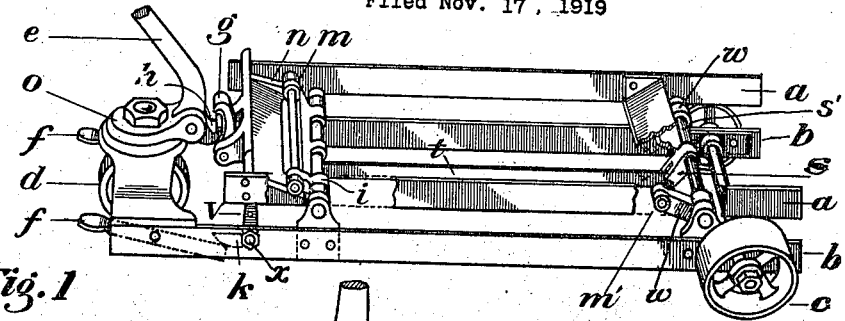
Figure 1 is a perspective view of a hand truck embodying the principles of this invention, parts being broken away and parts shown in section.
Figure 2:
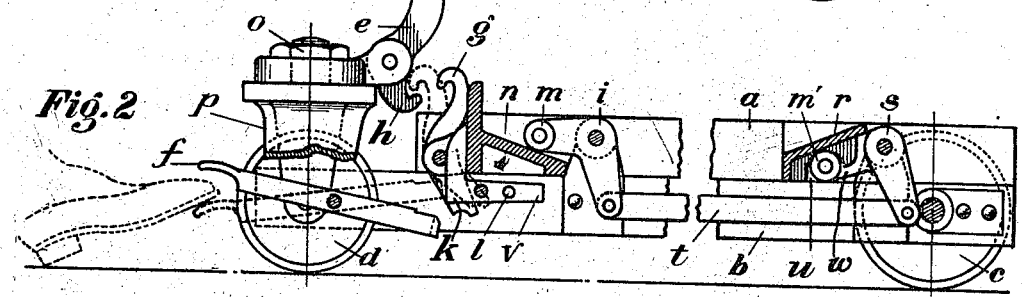
Figure 2 is a longitudinal section of the same, parts being broken away and parts shown in side elevation.
Figure 3:
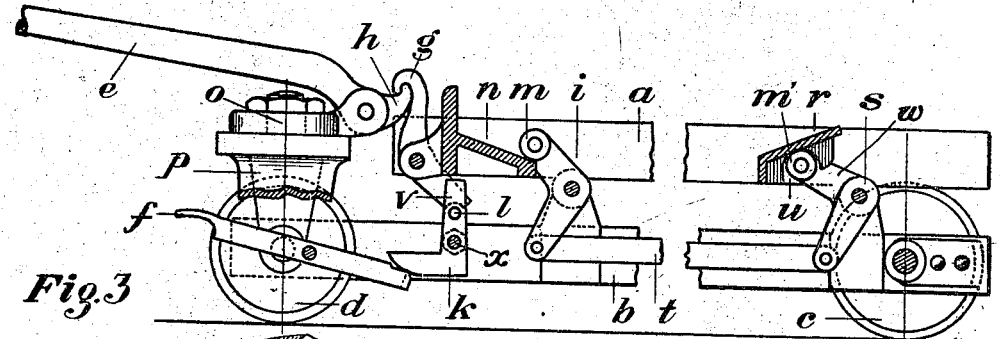
Figure 3 is a view similar to Figure 2 showing the parts in changed positions.
Figures 4, 5:
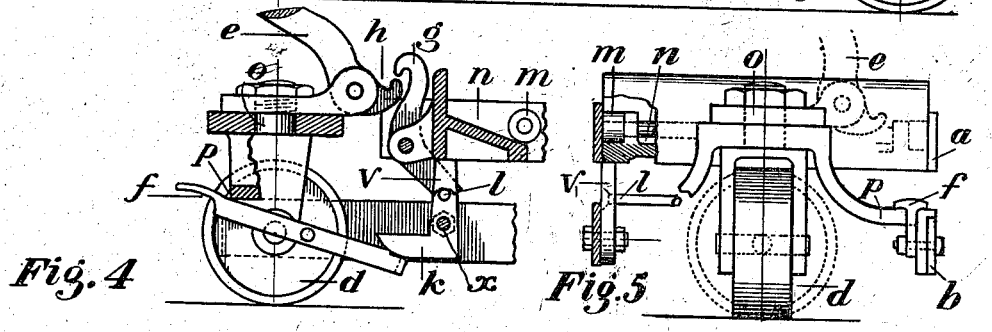
Figure 4 is a longitudinal section of the forward end of the truck showing the elevating frame locked in raised position.
Figure 5 is a front elevation of the truck, parts being broken away and parts shown in section.

Referring more particularly to the drawings, the truck comprises an upper or elevating frame $a$ mounted above a lower or traveling frame $b$. The lower frame is provided with rear wheels $c$ and a front or guiding wheel $d$ to the swivel frame of which is connected a handle or draw lever $e$. A pedal lever $f$ is pivotally mounted upon the traveling frame $b$ for operating certain elements to be hereinafter described in such a way as to control the position of a hook $g$ which is pivotally mounted upon the elevating frame. The hook $g$ is adapted to be engaged by a hook arm $h$ which is integral with the lever $e$, thus adapting the forward end of the elevating frame to be lifted by means of the lever $e$. A lever $i$, which is journalled in upwardly projecting lugs or brackets on the traveling frame, is provided with rollers $m$ which run on tracks $n$ on the elevating frame so that whenever the forward end of said elevating frame is raised, the lever $i$ is oscillated on its axis and transmits its movement by a connecting rod $t$ to a lever arm $s$ which is rigidly connected to a rear shaft $s'$ to which are keyed the lever arms $w$ provided with anti-friction rollers $m'$. The rollers $m'$ engage the under surface of a cross bar or member $r$ which is provided with sockets $u$ for accommodating the rollers $m'$. By referring to Figure 5, it will be seen that the side bars of the traveling frame $b$ are connected in front by an upwardly presented yoke $p$ which supports a collar $o$ to which the lever $e$ is fulcrumed. As shown in Figures 2, 3 and 4, the hook lever $g$ is provided in its depending arm with a rounded socket which is adapted to embrace a transverse rod $l$ which is carried by laterally spaced latch dogs $v$ which are fulcrumed on the opposite side bars of the traveling frame $b$. Each of the latch dogs $v$ is provided with a forwardly presented cam arm $k$ which is adapted to be engaged by the rear arm of the pedal arm $f$. The operation of my improved truck will now be readily understood. Let it be supposed that the elevating frame is lowered as shown in Figures 1 and 2. In this position, the side bars of the frame $a$ rest upon and are supported by the side bars of frame $b$. A load having been deposited upon the elevating frame, the foot of the operator may be applied to one of the pedal levers $f$ as shown in dotted lines in Figure 2. The rear arm of pedal lever $f$ is thrown into engagement with the lower arm of hook $g$ and throws the hook $g$ into position to be engaged by the hook arm $h$ when the lever $e$ is moved forwardly from its vertical position shown in Figure 2. The continued movement of the lever $e$ until it reaches the position shown in Figure 3, serves to elevate the forward end of the elevating frame $a$. At the same time, the tracks $n$ operating upon rollers $m$ rock the lever $i$ on its axis and communicate a similar movement to the rear lever $s$ which serves to elevate the rear end of the elevating frame in a corresponding manner. As the hook $g$ is lifted, its fulcrum rod releases the cam arms $k$ of the latch dogs $v$ and permits said latch dogs to drop into the position shown in Figure 3 in which position, they are locked by the socket formed in the depending end of the hook lever *g* when the lever *e* is lifted slightly so as to lower the elevating frame into the position in which it rests upon the upper ends of the latch dogs *v*. As shown in Figure 4 of the drawings when the elevating frame is supported by the dogs *v* in raised position, the lower end of hook lever *g* operates by gravity to hold said hook out of the path of the hook end *h* of lever or handle *e* and thus permits said lever or handle to be lowered in to position to drag the truck without lifting the elevating frame. In the position shown in Figure 4, the elevating frame with its load is supported in front by the laterally spaced dogs *v*, *v*, and in the rear by laterally spaced lever arms *w*, *w*, which carry the rollers *m'*, *m'*. The interlocking engagement of rollers *m'*, *m'*, with sockets *u*, *u*, prevents a forward or rearward swing of the elevating frame as their angular movements do not correspond to the angular movements of dogs *v*, *v*. When it is desired to lower the elevating frame, the lever *e* may be moved into position shown in Figure 3 when by applying pressure to either of the pedal levers *f* the latch dogs *v* are moved rearwardly to release the hook lever *g* after which the elevating frame may be lowered by the lever or handle *e*.

I claim:

1. In a truck or the like, a vehicle frame, a second frame, rock shafts mounted on fixed parallel axes on said vehicle frame, means for oscillatably connecting said rock shafts, lever arms keyed to said rock shafts, one of said lever arms when oscillated by the other lever arm being adapted to elevate one end of said second frame and the other of said lever arms being suitably disposed to be oscillated by said second frame when an elevating movement is imparted thereto, and means for elevating the other end of said frame.

2. In a truck, a traveling frame, an elevating frame provided with inclined tracks at one end, lever arms bearing on said tracks and adapted to be oscillated by said tracks when that end of the elevating frame is raised, lever arms adapted to raise the other end of said elevating frame, means for connecting the first mentioned lever arms to the second mentioned lever arms whereby the oscillatory movement imparted to the first mentioned lever arms by the upward movement of one end of the elevating frame is transmitted to the second mentioned lever arms for elevating the other end of said elevating frame, and means for raising the first mentioned end of the elevating frame.

3. In a truck, a traveling frame, a lever fulcrumed on said traveling frame, an elevating frame, a hook mounted on one end of said elevating frame and adapted to be engaged by said lever for lifting that end of the elevating frame, a lever arm oscillated by engagement with the lifted end of said elevating frame, a second lever arm operatably connected to the first mentioned lever arm for lifting the other end of said elevating frame, latch dogs pivoted on said traveling frame and adapted to be moved into and out of position to support said elevating frame in raised position, and means adapting said latch dogs to hold said hook in inoperative position when said elevating frame is in raised position.

ANDREW SONANDER.